3,796,725
N-OXIDES OF 5-(AMINOALKYL)-5,11-DIHYDRO-
DIBENZOXAZEPINES AND 5,11-DIHYDRODI-
BENZTHIAZEPINES
Harry Louis Yale and Jack Bernstein, New Brunswick,
N.J., assignors to E. R. Squibb & Sons, Inc., New
York, N.Y.
No Drawing. Continuation-in-part of applications Ser. No.
655,352, July 24, 1969, and Ser. No. 17,966, Mar. 9,
1970, both now abandoned. This application Jan. 27,
1971, Ser. No. 110,327
Int. Cl. C07d 87/00
U.S. Cl. 260—333      6 Claims

ABSTRACT OF THE DISCLOSURE

This invention relates to new N-oxides of basically substituted-5,11-dihydrodibenzoxazepines and 5,11-dihydrodibenzthiazepines which are useful as anti-arrhythmic agents and surface disinfectants.

---

This application is a continuation-in-part of applications Ser. Nos. 655,352, filed July 24, 1969 and 17,966 filed Mar. 9, 1970, both of which are now abandoned.

Brief Summary of the Invention

This invention relates to new N-oxids of basically substituted dihydrodibenzoxazepines and dihydrodibenzthiazepines of the formulae

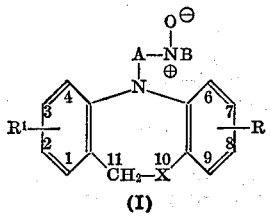

(I)

and

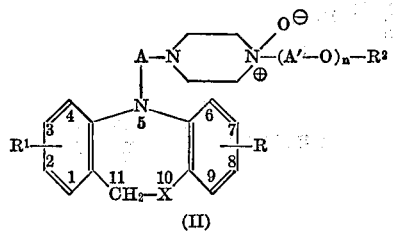

(II)

and salts thereof.

In Formula I A is lower alkylene, X is O or S, NB is a basic saturated tertiary nitrogen-containing radical of less than sixteen carbon atoms, and R and $R^1$ are the same or different representing hydrogen, halogen, lower cycloalkyl, (e.g., cyclopropyl or cyclobutyl), cyano, isocyano, lower alkanoyl, lower alkyl, lower cycloalkoxy (e.g., cyclopropoxy or cyclobutoxy), lower alkoxy, trifluoromethyl, trifluoromethylmercapto, trifluoromethoxy, lower alkylsulfonyl or N,N-dimethylaminosulfonamido. Among the suitable radicals represented by the symbol NB are: di(lower alkyl)amino; (hydroxy-lower alkyl)amino; di-(hydroxy-lower alkyl)amino; and basic saturated 5 to 7 membered N-heterocyclic radicals of less than twelve carbon atoms, as exemplified by piperidino; (lower alkyl) piperidino [e.g., 2,3 or 4-(lower alkyl)piperidino]; di-(lower alkyl)piperidino [e.g., 2,4- 2,5- or 3,5-di(lower alkyl)piperidino]; (lower alkoxy)piperidino; hydroxypiperidino; pyrrolidino; (lower alkyl)pyrrolidino; di-(lower alkyl)pyrrolidino; (lower alkoxy)pyrrolidino; hydroxypyrrolidino; morpholino [i.e., morpholino, and 3-morpholino]; (lower alkyl)morpholino; di(lower alkyl) morpholino; (lower alkoxy)morpholino; thiamorpholino; (lower alkyl)thiamorpholino; di(lower alkyl)thiamorpholino; (lower alkoxy)thiamorpholino; piperazino; homopiperazino; (lower alkyl)piperazino (e.g., 2,3,5 or 6-(lower alkyl)piperazino); di(lower alkyl)piperazino; (lower alkoxy)piperazino; (hydroxy-lower alkyl)piperazino [e.g., $N^4$-(2-hydroxyethyl)piperazino]; (alkanoyloxy-alkyl)piperazino [e.g., $N^4$-(2-acetoxyethyl)-, $N^4$-(2-heptanoyloxyethyl- or $N^4$-(decanoyloxyethyl)piperazino]; (hydroxy-lower alkoxy-lower alkyl)piperazino [e.g., $N^4$-(2-hydroxyethoxyethyl)piperazino]; (alkanoyloxy - lower alkoxy-lower alkyl)piperazino; [e.g., $N^4$-(heptanoyloxyethoxyethyl)piperazino]; and carbo-lower alkoxy)piperazino [e.g., $N^4$-(carbomethoxy, carboethoxy or carbopropoxy)piperazino]. In addition, other heterocyclic radicals represented by NB can be found in Yale et al. "Novel Polycyclic Heterocycles. Derivatives of 5,11-dihydrodibenz[b,e][1,4]oxazepine and 5,11 - dihydrodibenz[b,e][1,4]thiazepine." J. Med. Chem. 13, 713 (1970).

$N^4$-oxides of the invention are represented by the structure II, namely,

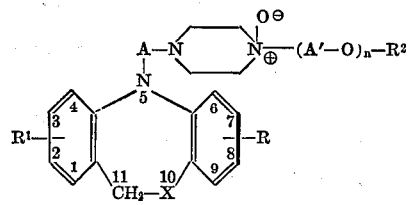

wherein A' is lower alkylene, n is one or two, and $R^2$ is hydrogen or an acyl radical of a hydrocarbon carboxylic acid or dicarboxylic acid containing from about 2 to about 14 carbon atoms. The preferred hydrocarbon carboxylic acids include the alkanolic acids (e.g., acetic, propionic, enanthic, decanoic and lauric acid), the alkenoic acids (e.g., undecylenic, oleic and 2-heptenoic acid), the alkynoic acids, the alkandienoic acids (e.g., heptadieneoic acid), aryl carboxylic acids (e.g., benzoic acid), cycloalkanecarboxylic acids, arylalkanoic acids (e.g., phenylacetic and β-phenylpropionic acid), cycloalkanedicarboxylic acids (e.g., hexahydroterephthalic acid) and the alkanedioic acids (e.g., succinic, glutaric, adipic and azelaic acid).

The terms "lower alkyl," "lower alkoxy," "lower alkanoyl" and "lower alkylene," as employed herein, include both straight and branched chain radicals of less than eight carbon atoms. The alkanoyloxy groups include acyloxy radicals of less than 15 carbon atoms. The particularly preferred compounds are those wherein A is a lower alkylene radical of one to three carbon atoms (i.e., methylene, ethylene, trimethylene-1,3 and propylene-1,3 and propylene-1,2); NB is di(lower alkyl)amino, e.g., dimethylamino, R and R' are hydrogen and X is oxygen.

The N-oxides and $N^4$-oxides of dihydrodibenzoxazepines and dihydrodibenzthiazepines form salts with inorganic and organic acids. The salts frequently provide convenient means for separating, isolating and utilizing the product. Neutralization with a base such as sodium hydroxide yields the free base. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, fumaric, tartaric, citric, acetic, succinic and pamoic acid.

The compounds of this invention have anti-arrhythmic properties and are useful in combatting cardiac arrhythmia in animal species in amounts of about 5 to 40 mg./kg. three to four times daily with superior results. They may be administered orally or parenterally in conventional dosage forms such as tablets, capsules, injectables or the like by incorporating the appropriate dose of the free base or a physiologically acceptable acid addition salt with carriers according to accepted pharmaceutical practice. The compounds are also useful as surface disinfectants or to prevential bacterial or fungal overgrowth in cultures, in aqueous solutions or suspensions at concentrations of about 0.001 to 0.1%, to eliminate organisms such as *S. aureus, S. schottmuelleri, T. mentagrophytes* or the like.

The compounds of this invention are prepared by reacting a compound of the formula:

(II)

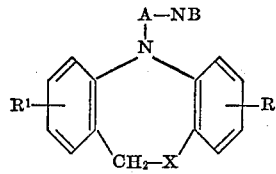

wherein A, X, NB, R and R' are as hereinbefore defined, with one equivalent of hydrogen peroxide, the reaction preferably being carried out in an inert organic solvent for the azepine reactant, such as an alkanol (e.g., ethanol). The method for preparing the starting materials for this reaction is disclosed in U.S. Pat. No. 3,069,432, granted Dec. 18, 1962. To prepare the acid-addition salts, the resulting base is treated with the desired acid in the usual manner.

To prepare the N$^4$-oxides compounds of this invention, compounds of the Formula IIa:

(IIa)

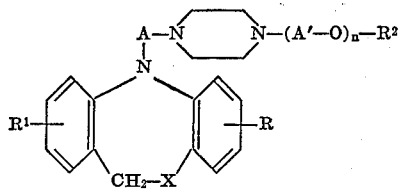

wherein X, A, A', $n$, R, R$^1$ and R$^2$ are as hereinbefore defined, in the form of its free base, are interacted with one equivalent of hydrogen peroxide to yield the final products of this invention in the form of their free bases. The reaction is preferably carried out in an inert organic solvent for the azepine reactant, such as an alkanol (e.g., ethanol). If an acid-addition salt is desired, the free bases are then reacted with the desired acid in the usual manner.

The method for preparing the starting materials for this reaction is disclosed in U.S. Pats. Nos. 3,069,432 and 3,188,322.

One of the starting materials for the preparations of the dihydrodibenzoxazepines (3,069,432) and the dihydrodibenzthiazepines (3,188,322) namely, (III)

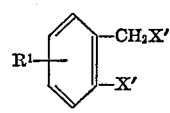

wherein R$^1$ is as defined above and X' is chloro or bromo, is prepared by the following sequence of reactions:

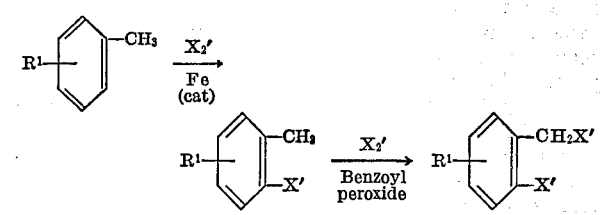

In preparing the dihydrodibenzoxazepines, Compound III is reacted with an o-nitrophenol of the structure (IV)

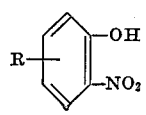

wherein R is as defined above. Compound IV can be prepared by employing the following sequence of reactions:

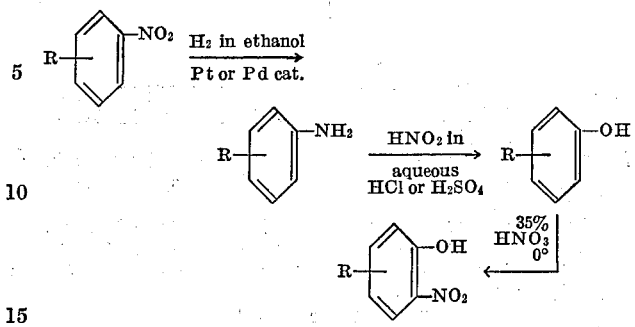

In preparing the dihydrodibenzthiazepines, Compound III is reacted with an o-aminobenzenethiol of the structure (V)

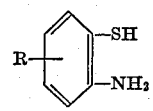

wherein R is as defined above. Compound V wherein R is other than isocyano can be prepared according to the following sequence of reactions:

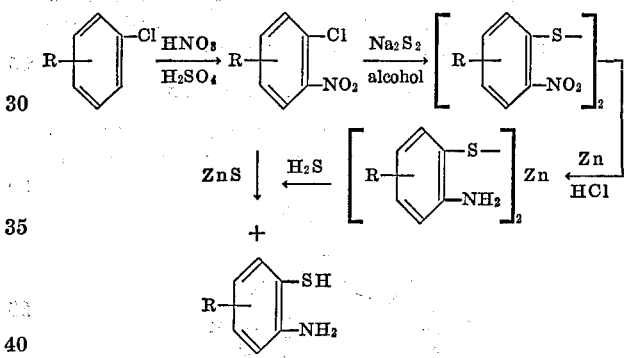

where R is isocyano, Compound V is prepared according to the following reaction sequence:

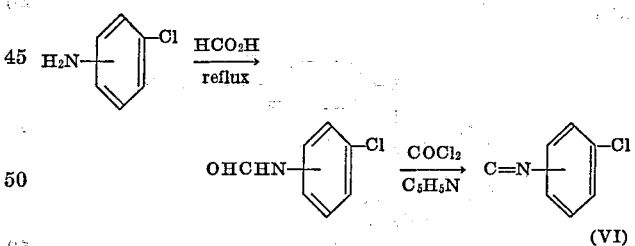

(VI)

Compound VI can then be employed in the above reaction sequence in lieu of

to form the starting material (VII)

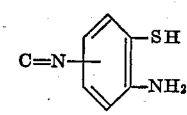

Suitable o-halobenzyl halides which can be employed herein include those disclosed in U.S. Pat. No. 3,069,432 as well as 5-cyano-2-bromobenzyl bromide, 4-cyano-2-chlorobenzyl chloride, 4-isocyano-2-bromobenzyl bromide, 4 - acetyl - 2-bromobenzyl bromide, and 5-propionyl-2-chlorobenzyl chloride.

Suitable o-nitrophenols which can be employed herein include those disclosed in U.S. Pat. No. 3,069,432 as well as 5 - cyano - 2 - nitrophenol, 4 - cyano - 2 - nitrophenol, 5 - isocyano - 2 - nitrophenyl, 4 - isocyano - 2 - nitrophenol, 5 - isocyano - 2 - nitrophenyl, 4-isocyano-2-nitrophenol, 4-butyryl-2-nitrophenol, 5 - acetyl - 2-nitrophenol, 5-heptanoyl-2-nitrophenol.

Suitable o-aminobenzenethiols which can be employed herein include those disclosed in U.S. Pat. No. 3,188,322 as well as 4-cyano-2-aminobenzenethiol, 5-cyano-2-aminobenzenethiol, 4-isocyano-2-aminobenzenethiol, 5-isocyano-2-aminobenzenethiol, 3-isocyano-2-aminobenzenethiol, 4-propionyl-2-aminobenzenethiol, 5-acetyl-2-aminobenzenethiol, and 4-butyryl-2-aminobenzenethiol.

Examples of $N^4$-oxides falling within the invention include, but are not limited to, the following:

5-[2-[$N^4$-(2-hydroxyethyl)piperazino]ethyl]-5,11-dihydrodibenz[b,e][1,4]oxazepine,
5-[3-[$N^4$-(2-hydroxyethyl)piperazino]propyl]-5,11-dihydrodibenz[b,e][1,4]oxazepine,
5-[$N^4$-[3-(3-hydroxypropyl)piperazino]propyl]-5,11-dihydrodibenz[b,e][1,4]thiazepine,
5-[3-[$N^4$-(2-hydroxyethyl)piperazino]propyl]-2-chloro-5,11-dihydrodibenz[b,e][1,4]oxazepine,
5-[3-[$N^4$-(2-hydroxyethyl)piperazine]propyl]-2-methyl-5,11-dihydrodibenz[b,e][1,4]thiazepine,
5-[3-[$N^4$-(2-hydroxyethyl)piperazino]propyl]-7-cyclopropyl-5,11-dihydrodibenz[b,e][1,4]oxazepine,
5-[3-[$N^4$-(2-hydroxyethyl)piperazino]propyl]-3-methoxy-5,11-dihydrodibenz[b,e][1,4]thiazepine,
5-[3-[$N^4$-(2-hydroxyethyl)piperazino]propyl]-7-acetyl-5,11-dihydrodibenz[b,e][1,4]oxazepine,
5-[3-[$N^4$-(2-hydroxyethyl)piperazino]propyl]-3-cyano-5,11-dihydrodibenz[b,e][1,4]oxazepine,
5-[3-[$N^4$-(2-hydroxyethyl)piperazino]propyl]-3-methylmercapto-5,11-dihydrodibenz[b,e][1,4]oxazepine,
5-[3-[$N^4$-(2-hydroxyethyl)piperazino]propyl]-7-(N,N'-dimethylaminosulfonyl)-5,11-dihydrodibenz[b,e][1,4]oxazepine,
5-[3-[$N^4$-(2-hydroxyethyl)piperazino]propyl]-7-trifluoromethylmercapto-5,11-dihydrodibenz[b,e][1,4]thiazepine,
5-[3-[$N^4$-(2-hydroxyethyl)piperazino]propyl]-7-methylsulfonyl-5,11-dihydrodibenz[b,e][1,4]thiazepine,
5-[3-[$N^4$-(2-hydroxyethyl)piperazino]propyl]-2-trifluoromethyl-5,11-dihydrodibenz[b,e][1,4]oxazepine,
5-[3-[$N^4$-(2-acetoxyethyl)piperazino]propyl]-2-trifluoromethyl-5,11-dihydrodibenz[b,e][1,4]thiazepine,
5-[3-[$N^4$-[2-(2-hydroxyethoxy)ethyl]piperazino]propyl]-3-trifluoromethyl-5,11-dihydrodibenz[b,e][1,4]oxazepine,
5-[3-[$N^4$-[2-(2-acetoxyethoxy)ethyl]piperazino]propyl]-2-trifluoromethyl-5,11-dihydrodibenz[b,e][1,4]thiazepine,
5-[3-[$N^4$-(2-heptanoyloxyethyl)piperazino]propyl]-7-trifluoromethoxy-5,11-dihydrodibenz[b,e][1,4]oxazepine,
5-[3-[$N^4$-(2-decanoyloxyethyl)piperazino]propyl]-3-trifluoromethyl-5,11-dihydrodibenz[b,e][1,4]oxazepine,
5-[3-[$N^4$-(2-undecenoyloxyethyl)piperazino]propyl]-2-trifluoromethyl-5,11-dihydrodibenz[b,e][1,4]thiazepine,
5-[3-[$N^4$-(2-hydroxyethyl)piperazino]propyl]-7-ethoxy-5,11-dihydrodibenz[b,e][1,4]oxazepine,
5-[3-[$N^4$-(2-hydroxyethyl)piperazino]propyl]-3,7-dichloro-5,11-dihydrodibenz[b,e][1,4]thiazepine,
5-[3-[$N^4$-(2-hydroxyethyl)piperazino]propyl]-3,7-dimethyl-5,11-dihydrodibenz[b,e][1,4]oxazepine,
5-[2-[$N^4$-(3-hydroxypropyl)piperazino]ethyl]-2-trifluoromethyl-5,11-dihydrodibenz[b,e][1,4]thiazepine, and
5-[3-[$N^4$-(2-benzoyloxyethyl)piperazino]propyl]-2-trifluoromethyl-5,11-dihydrobenz[b,e][1,4]oxazepine.

The following examples illustrate the invention (all temperatures being in centigrade):

EXAMPLE 1

5-(2-dimethylaminoethyl)-5,11-dihydrodibenz[b,e][1,4]oxazepine N-oxide maleate

A mixture of 6.5 g. of 5-(2-dimethylaminoethyl)-5,11-dihydrodibenz[b,e][1,4]oxazepine, 3.0 g. of 30% aqueous hydrogen peroxide and 50 ml. of 95% ethanol are heated under reflux for 3.5 hours and concentrated to dryness to give the N-oxide base as the viscous yellow oil. To this oil, in 20 ml. of acetone, is added a solution of 2.8 g. of maleic acid in 20 ml. of acetone to give the product, 5-(2-dimethylaminoethyl) - 5,11 - dihydrodibenz[b,e][1,4]oxazepine N-oxide maleate, M.P. 164–166° after recrystallization from acetone-anhydrous ether.

EXAMPLE 2

5-(3-dimethylamino-2-methylpropyl)-5,11-dihydrodibenz[b,e][1,4]oxazepine N-oxide maleate By substituting 6.7 g. of 5-(3-dimethylamino-2-methylpropyl)-5,11-dihydrodibenz[b,e][1,4]oxazepine for the 5-(2-dimethylaminoethyl) - 5,11 - dihydrodibenz[b,e][1,4]oxazepine in Example 1, there is obtained 5-(3-dimethylamino-2-methylpropyl) - 5,11 - dihydrodibenz[b,e][1,4]oxazepine N-oxide maleate.

EXAMPLE 3

5,11-dihydro-5-(1-methyl-3-piperidinomethyl)dibenz[b,e][1,4]oxazepine N-oxide maleate (a) Preparation of 5,11 - dihydro-5-(1-methyl-3-piperidylmethyl)dibenz[b,e][1,4]oxazepine: From 9.9 g. of 5,11-dihydrodibenz[b,e][1,4]oxazepine, 1.4 g. of sodium hydride, 75 ml. of dimethylsulfoxide, and 11.1 g. of 1-methyl-3-piperidinomethyl chloride there is obtained 5,11-dihydro-5-(1 - methyl - 3 - piperidinomethyl)dibenz[b,e][1,4]oxazepine, B.P. 194–196° (0.4 mm.).

(b) Preparation of the N-oxide: By substituting 7.2 g. of the product from (a) for the 5 - (2 - dimethylaminoethyl)-5,11-dihydrodibenz[b,e][1,4]oxazepine in Example 1, there is obtained 5,11-dihydro - 5 - (1-methyl-3-piperidinomethyl)dibenz[b,e][1,4]oxazepine N-oxide maleate.

EXAMPLE 4

5,11-dihydro-5-(1-methyl-4-piperidinomethyl)dibenz[b,e][1,4]oxazepine N-oxide maleate (a) Preparation of 5,11 - dihydro-5-(1-methyl-4-piperidinomethyl)dibenz[b,e][1,4]oxazepine: By substituting 11.1 g. of 1-methyl-4-piperidinomethyl chloride (prepared from 1 - methyl-4-piperidinomethanol and thionyl chloride) for the 1-methyl-3-piperidinomethyl chloride in Example 3(a), there is obtained 5,11-dihydro-5-(1-methyl-4-piperidinomethyl)dibenz[b,e][1,4]oxazepine.

(b) Preparation of the N-oxide: By substituting 7.2 g. of the product from (a) for the 5 - (2 - dimethylaminoethyl)-5,11-dihydrodibenz[b,e][1,4]oxazepine in Example 1, there is obtained 5,11-dihydro-5-(1-methyl-4-piperidinomethyl)dibenz[b,e][1,4]oxazepine N-oxide maleate.

By following the procedure of Example 1 but substituting for the 5-(2-dimethylaminoethyl)-5,11-dihydrodibenz[b,e][1,4]oxazepine a proportionate amount of the following derivatives, there is obtained the corresponding N-oxide:

5,11-dihydro-5-(2-diethylaminoethyl)dibenz[b,e][1,4]oxazepine,
5,11-dihydro-5-(2-dimethylaminopropyl)dibenz[b,e][1,4]oxazepine,
5,11-dihydro-5-(3-$N^4$-methylpiperazinopropyl)dibenz[b,e][1,4]oxazepine,
5,11-dihydro-5-(2-dimethylaminoethyl)-7-chloro-dibenz[b,e][1,4]oxazepine,
5,11-dihydro-5-(2-dimethylaminopropyl)-7-chlorodibenz[b,e][1,4]oxazepine, and
5,11-dihydro-5-(3-dimethylaminopropyl)-7-chlorodibenz[b,e][1,4]oxazepine.

The corresponding thiazepines give the corresponding dihydrodibenzthiazepine N-oxides.

EXAMPLE 5

5-[3-[bis(2-hydroxyethyl)amino]propyl]-5,11-dihydrodibenz[b,e][1,4]oxazepine N-oxide (a) 13.7 g. of 5-(3-chloropropyl)-5,11-dihydrodibenz[b,e][1,4]oxazepine (prepared by refluxing 5,11-dihydrodibenz[b,e][1,4]oxazepine in ethylmethyl ketone and 1-bromo-3-chloropropane and granular sodium hydroxide), 5.25 g. diethanolamine, 7.5 g. sodium iodide and 70 ml. of purified ethylmethyl ketone are refluxed for 18 hours to form 8.8 g. of 5-[3-bis(2-hydroxyethyl)propyl]-5,11-dihydrodibenz[b,e][1,4]oxazepine.

(b) By substituting 7.97 g. of the product from (a) for the 5-(2-dimethylaminoethyl)-5,11-dihydrodibenz[b,e][1,4]-oxazepine in Example 1, there is obtained the title compound.

EXAMPLE 6

5-(2-dimethylaminoethyl)-5,11-dihydrodibenz[b,e][1,4]thiazepine N-oxide maleate

By substituting 6.7 g. of 5-(2-dimethylaminoethyl)-5,11-dihydrodibenz[b,e][1,4]thiazepine for the 5-(2-dimethylaminoethyl)-5,11-dihydrodibenz[b,e][1,4]oxazepine in Example 1, there is obtained 5-(2-dimethylaminoethyl)-5,11-dihydrdibenz[b,e][1,4]thiazepine N-oxide maleate.

EXAMPLE 7

5-[3-(pyrrolidino)propyl]-5,11-dihydrodibenz[b,e][1,4]oxazepine N-oxide (a) By substituting 3.60 g. of pyrrolidine for the diethanolamine in Example 5(a) there is obtained 5-[3-(pyrrolidino)propyl]-5,11-dihydrodibenz[b,e][1,4]oxazepine.

(b) By substituting 7.2 g. of the product from (a) for the base in Example 5(b) there is obtained 5-[3-(pyrrolidino)propyl]-5,11-dihydrodibenz[b,e][1,4]oxazepine N-oxide.

EXAMPLE 8

5-[3-(hydroxypiperidino)propyl]-5,11-dihydrodibenz[b,e][1,4]oxazepine N-oxide (a) By substituting 5.15 g. of 4-hydroxypiperidine for the diethanolamine in Example 5(a) there is obtained 5-([3-(4-hydroxypiperidino)propyl]5,11-dihydrodibenz[b,e][1,4]oxazepine.

(b) By substituting 7.85 g. of the product from (a) for the base in Example 5(a) there is obtained 5-[3-(4-hydroxypiperidino)propyl]-5,11-dihydrodibenz[b,e][1,4]oxazepine N-oxide.

(c) The decanoate ester is obtained by dissolving the base from part (b) in benzene adding one equivalent of decanoyl chloride. The solution is refluxed for three hours and then worked up to obtain the product.

EXAMPLE 9

5-[3-(3-methylpyrrolidino)propyl]5,11-dihydrodibenz[b,e][1,4]oxazepine N-oxide (a) By substituting 4.32 g. of 3-methylpyrrolidine for the pyrrolidine in Example 7(a) there is obtained 5-[3-(3-methylpyrrolidino)propyl]-5,11-dihydrodibenz[b,e][1,4]oxazepine.

(b) By substituting 7.5 g. of the product from (a) for the base in Example 5(b) there is obtained 5-[3-(3-methylpyrrolidino)propyl]-5,11-dihydrodibenz[b,e][1,4]oxazepine N-oxide.

EXAMPLE 10

7-(N,N-dimethylaminosulfonyl)-5,11-dihydro-5-(2-di methylaminoethyl)dibenz[b,e][1,4]oxazepine N-oxide (a) The 7-(amidosulfonyl)-5,11-dihydro-5-(2-dimethylaminoethyl)dibenz[b,e][1,4]oxazepine is prepared by the following sequence of reactions: 2-amino-4-nitrophenol→ 2-formamido-4-nitrophenol→ 2-formamido-4-nitrophenyl o-bromobenzyl ether→ 7-nitro-5,11-dihydrodibenz[b,e][1,4]oxazepine→ 5-(2-dimethylaminoethyl)-7-nitro-5,11-dihydrodibenz[b,e][1,4]oxazepine→ 5-(2-dimethylaminoethyl-7-amino-5,11 - dihydrodibenz[b,e][1,4]oxazepine→ 5 - (2-dimethylaminoethyl)-7-(chlorosulfonyl)-5,11-dihydrodibenz[b,e][1,4]oxazepine→ 7-(N,N-dimethylaminosulfonyl) - 5,11-dihydro-5-(2-dimethylaminoethyl)dibenz[b,e][1,4]oxazepine.

(b) By substituting 8.45 g. of the product from (a) for the base in Example 5(b) there is obtained 7-(N,N-dimethylaminosulfonyl)-5,11-dihydro-5-(2 - dimethylaminoethyl)dibenz[b,e][1,4]oxazepine N-oxide.

EXAMPLE 11

5,11-dihydro-7-methyl-5-(3-morpholinopropyl)dibenz[b,e][1,4]oxazepine N-oxide (a) By substituting 2-nitro-p-cresol for the o-nitrophenol in Example 1 of U.S. Pat. No. 3,069,432 there is obtained 5,11 - dihydro-7-methyldibenz[b,e][1,4]oxazepine.

(b) By substituting the appropriate amount of the product from (a) for the 5,11-dihydrodibenz[b,e][1,4]oxazepine in Example 5(a) there is obtained 5-(3-chloropropyl)-5,11-dihydro-7-methyldibenz[b,e][1,4]oxazepine.

(c) By substituting 6.6 g. of the product from (b) for the 5-(3-chloropropyl)-5,11-dihydrodibenz[b,e][1,4]oxazepine and 4.44 g. of morpholine for the diethylamine in Example 5(a) there is obtained 5,11-dihydro-7-methyl-5-(3-morpholinopropyl)dibenz[b,e][1,4]oxazepine.

(d) By substituting 8.2 g. of the product from (c) for 10.5 g. of the base in Example 5(b) there is obtained 5,11 - dihydro - 7 - methyl-5-(3-morpholinopropyl)dibenz[b,e][1,4]oxazepine N-oxide.

EXAMPLE 12

5,11-dihydro-7-methoxy-5-(3-thiamorpholinopropyl) dibenz[b,e][1,4]oxazepine N-oxide By substituting 2-nitrohydroquinone-4-methyl ether for the 2-nitro-p-cresol and thiamorpholine for the morpholine in Example 11 there is obtained 5,11-dihydro-7-methoxy-5-(3 - thiamorpholinopropyl)dibenz[b,e][1,4]oxazepine N-oxide.

EXAMPLE 13

5-[3-[N$^4$-(2-hydroxyethyl)piperazino]propyl] - 5,11 - dihydro-7-(trifluoromethyl)dibenz - [b,e][1,4]oxazepine N$^4$-oxide (a) Preparation of 5-[3-[N$^4$-(2-hydroxyethyl)piperazino]propyl]-5,11-dihydro - 7 - (trifluoromethyl)dibenz[b,e][1,4]oxazepine: A mixture of 10.0 g. of 5,11-dihydro - 7 - (trifluoromethyl)dibenz[b,e][1,4]oxazepine, 100 ml. of purified ethyl methyl ketone, 23.8 g. of 1-bromo-3-chloropropane, and 12.2 g. of granular sodium hydroxide are refluxed for 6 hours to give 8.0 g. of 5-(3-chloropropyl)-5,11-dihydro - 7 - (trifluoromethyl)dibenz[b,e][1,4]oxazepine, M.P. 63–64°.

The 5,11-dihydro-7-(trifluoromethyl)dibenz[b,e][1,4]oxazepine is prepared by the procedure disclosed in U.S. Pat. No. 3,069,432, substituting, for example, 2-nitro-4-(trifluoromethyl)phenol for the o-nitrophenol in Example 1.

From 8.0 g. of the 5-(3-chloropropyl)-5,11-dihydro-7-trifluoromethyl)dibenz[b,e][1,4]oxazepine, 3.72 g. of sodium iodide, and 6.68 g. of 1-piperazineethanol, and 70 ml. of purified ethyl methyl ketone after 18 hours of reflux there is obtained 7.1 g. of the base 5-[3-[N$^4$-(2-hydroxyethyl)piperazino]-propyl]-5,11-dihydro - 7 - (trifluoromethyl)dibenz-[b,e][1,4]oxazepine as a viscous gum. The product is characterized by conversion in acetonitrile to the dimaleate salt, M.P. 168–170° (dec.).

(b) Preparation of N$^4$-oxide: A mixture of 10.5 g. of 5 - [3 - [N$^4$ - (2-hydroxyethyl)piperazino]-propyl]-5,11-dihydro-7-(trifluoromethyl)dibenz - [b,e][1,4]oxazepine, 3.0 g. of 30% aqueous hydrogen peroxide and 50 ml. of 95% ethanol are heated under reflux for 3.5 hours and concentrated to dryness to give the $N^4$-oxide base product, 5-[3-[$N^4$-[2-hydroxyethyl)piperazino]-propyl]-5,11-dihydro-7-(trifluoromethyl)dibenz - [b,e][1,4]oxazepine $N^4$-oxide.

(c) The heptanoate ester is obtained by dissolving the $N^4$-oxide from part (b) in chloroform and adding one equivalent of heptanoyl chloride. The solution is refluxed for three hours and then worked up to obtain the product.

EXAMPLES 14 TO 28

By following the procedure of Example 13 but substituting for the 5-[3-[$N^4$-[2-hydroxyethyl)piperazino)propyl]-5,11-dihydro-7-(trifluoromethyl)dibenz - [b,e][1,4]oxazepine a proportionate amount of the following derivatives, there is obtained the corresponding $N^4$-oxides:

Example 14: 5-[3-[$N^4$-(3-hydroxypropyl)piperazino] propyl]-5,11-dihydrodibenz[b,e][1,4]oxazepine Example 14a: 5-[2-[$N^4$-(2-hydroxyethyl)piperazino] ethyl]-5,11-dihydrodibenz[b,e][1,4]oxazepine Example 15: 5-[3-[$N^4$-(2-hydroxyethyl)piperazino] propyl]-5,11-dihydrodibenz[b,e][1,4]oxazepine Example 16: 5-[3-[$N^4$-(2-hydroxyethyl)piperazino] propyl]-2-chloro-5,11-dihydrodibenz[b,e][1,4] oxazepine Example 17: 5-[3-[$N^4$-(2-hydroxyethyl)piperazino] propyl]-2-methyl-5,11-dihydrodibenz[b,e][1,4] oxazepine Example 18: 5-[3-[$N^4$-(2-hydroxyethyl)piperazino] propyl]-7-cyclopropyl-5,11-dihydrodibenz-[b,e][1,4]oxazepine Example 19: 5-[3-[$N^4$-(2-hydroxyethyl)piperazino] propyl]-3-methoxy-5,11-dihydrodibenz-[b,e][1,4]oxazepine Example 20: 5-[3-[$N^4$-(2-hydroxyethyl)piperazino] propyl]-7-acetyl-5,11-dihydrodibenz[b,e][1,4] oxazepine Example 21: 5-[3-[$N^4$-(2-hydroxyethyl)piperazino] propyl]-3-cyano-5,11-dihydrodibenz[b,e][1,4] oxazepine Example 22: 5-[3-[$N^4$-(2-hydroxyethyl)piperazino] propyl]-3-methylmercapto-5,11-dihydrodibenz-[b,e][1,4]oxazepine Example 23: 5-[$N^4$-(2-hydroxyethyl)piperazino] methyl]-5,11-dihydrodibenz[b,e][1,4] oxazepine Example 24: 5-[3-[$N^4$-(hydroxymethyl)piperazino] methyl]-7-trifluoromethylmercapto-5,11-dihydrodibenz[b,e][1,4]oxazepine Example 25: 5-[3-[$N^4$-(2-acetoxyethyl)piperazino] propyl]-2-trifluoromethyl-5,11-dihydrodibenz-[b,e][1,4]oxazepine Example 26: 5-[3-[$N^4$-(2-heptanoyloxyethyl)piperazino] propyl]-7-trifluoromethyl-5,11-dihydrodibenz-[b,e,][1,4]oxazepine Example 27: 5-[3-[$N^4$-(2-hydroxyethyl)piperazino] propyl]-3,7-dimethyl-5,11-dihydrodibenz-[b,e][1,4]oxazepine

EXAMPLE 28

7-(N,N' - dimethylaminosulfonyl) - 5,11 - dihydro-5-[3-[$N^4$ - (2 - hydroxyethyl)piperazino]propyl]dibenz[b,e][1,4]oxazepine $N^4$-oxide (a) The 7-(amidosulfonyl) - 5,11 - dihydro-5-[3-[$N^4$-(2 - hydroxyethyl)piperazino]propyl]dibenz[b,e][1,4]oxazepine is prepared by the following sequence of reactions: 2 - amino-4-nitrophenol→2-formamido-4-nitrophenol→2-formamido-4-nitrophenyl o-bromobenzyl ether→7-nitro-5,11-dihydrodibenz[b,e][1,4]oxazepine→5 - [3 - [$N^4$-hydroxyethyl)piperazino]propyl] - 7 - nitro-5,11-dihydrodibenz[b,e][1,4]oxazepine→5-[3-[$N^4$ - (2 - hydroxyethyl)-piperazino]propyl]-7-amino - 5,11 - dihydrodibenz[b,e][1,4]oxazepine→5-[3-[$N^4$-(2 - hydroxyethyl)piperazino]propyl]-7-(chlorosulfonyl)-5,11 - dihydrodibenz[b,e][1,4] oxazepine→7-(N,N' - dimethylaminosulfonyl)-5,11-dihy- dro - 5 - [3-[$N^4$-(2-hydroxyethyl)piperazino]propyl]-dibenz[b,e][1,4]oxazepine.

(b) By substituting 10.9 g. of the product from (a) for the base in Example 13(b) there is obtained 7-(N,N'-dimethylaminosulfonyl) - 5,11 - dihydro-5-[3-[$N^4$-(2-hydroxyethyl)piperazino]propyl] dibenz [b,e] [1,4] oxazepine $N^4$-oxide.

EXAMPLE 29

5-[3-[$N^4$-(2-hydroxyethyl)piperazino]propyl-5,11-dihydrodibenz[b,e][1,4]thiazepine-$N^4$-oxide (a) Preparation of 5-[3-[$N^4$-(2-hydroxyethyl)piperazino]propyl]-5,11-dihydrodibenz[b,e][1,4]thiazepine: To a stirred solution of 119.5 g. of o-bromobenzyl bromide and 62.5 g. of o-aminobenzenethiol in 400 ml. of 95% ethanol, thoroughly purged with nitrogen, is added dropwise a solution of 39.6 g. of 85% potassium hydroxide in 200 ml. of water and the reaction mixture subsequently refluxed for two hours. The mixture is then concentrated to dryness. The residue is dissolved in one liter of ether, washed well with water, and the ether solution concentrated to give 2-(o-bromobenzylmercapto)aniline.

To a mixture of 169 g. of 98–100% formic acid and 73.5 g. of acetic anhydride is added slowly 147 g. of 2-(o-bromobenzylmercapto)aniline. Subsequently, the mixture is refluxed one-half hour and concentrated to dryness to give 2-(o-bromobenzylmercapto)formanilide.

A stirred mixture of 64.4 g. of 2-(o-bromobenzylmercapto)formanilide, 28 g. of anhydrous potassium carbonate, 5 g. of copper powder, and 500 ml. of dimethylformamide is heated under nitrogen in oil bath maintained at 155–160° for four hours. The reaction mixture is then filtered hot, and the filtrate concentrated to dryness. The residue is extracted repeatedly with boiling petroleum ether, the petroleum ether extracts are decolorized with Darco, filtered and concentrated to give 5,11-dihydrodibenzo[b,e][1,4]thiazepine-5-carboxaldehyde, M.P. 125–127°.

10 g. of 5,11-dihydrodibenz[b,e][1,4]thiazepine-5-carboxaldehyde is dissolved in a mixture of 100 ml. of 95% ethyl alcohol and 20 ml. of 10% aqueous sodium hydroxide. The solution is refluxed for one hour, cooled, neutralized and concentrated to dryness. The residue is extracted with boiling petroleum ether and the petroleum ether extracts decolorized with Darco and concentrated to give 5,11 - dihydrodibenz[b,e][1,4]thiazepine, M.P. 118–119°.

A stirred mixture of 8.58 g. of 5,11-dihydrobenz-[b,e][1,4]thiazepine, 2.3 g. of a 50% sodium hydride dispersion in mineral oil, and 200 ml. of tetrahydrofuran is stirred for two hours at room temperature and 7.9 g. of trimethylenechlorobromide is added. The mixture is heated under reflux for three hours. The reaction mixture is then worked up to give 5-(3-chloropropyl)-5,11-dihydrodibenz[b,e][1,4]-thiazepine.

To 4.55 g. of 5-(3-chloropropyl)-5,11-dihydrodibenz-[b,e][1,4]thiazepine in 100 ml. of methyl ethyl ketone is added 15 g. of sodium iodide and 23.2 g. of 1-(2-hydroxyethyl)-piperazine. The mixture is stirred and refluxed for eighteen hours and concentrated from the steam bath. The residue is diluted with water and extracted with ether. The ether extracts are concentrated to give 5-[3-[$N^4$-(2 - hydroxyethyl)piperazino]-propyl]-5,11-dihydrodibenz[b,e][1,4]thiazepine.

(b) Preparation of $N^4$-oxide: A mixture of 11.5 g. 5-[3-[$N^4$-(2-hydroxyethyl) - piperazino]propyl]-5,11-dihydrodibenz[b,e][1,4]thiazepine, 3 g. of 30% aqueous hydrogen peroxide and 50 ml. of 95% ethanol are heated under reflux for 3.5 hours and concentrated to give the $N^4$-oxide product, 5-[3-[$N^4$-(2-hydroxyethyl)piperazino]propyl]-5,11-dihydrodibenz[b,e][1,4]thiazepine $N^4$-oxide.

EXAMPLES 30 TO 45

By following the procedure of Example 29 but substituting for the 5-[3-[$N^4$-hydroxyethyl)piperazino]propyl]-

5,11-dihydrodibenz[b,e][1,4]thiazepine a proportionate amount of the following derivatives, there is obtained the corresponding N⁴-oxide:

Example 30: 5-[3-[N⁴-(2-hydroxyethyoxyethyl)piperazino]propyl]-5,11-dihydrodibenz[b,e][1,4]thiazepine
Example 31: 5-[3-[N⁴-acetoxyethyl)piperazino]propyl]-5,11-dihydrodibenz[b,e][1,4]thiazepine
Example 32: 5-[N⁴-(2-hydroxyethyl)piperazinoethyl]-5,11-dihydrodibenz[b,e][1,4]thiazepine
Example 33: 5-[3-[N⁴-(3-hydroxypropyl)piperazino]propyl-5,11-dihydrodibenz[b,e][1,4]thiazepine
Example 34: 5-[3-[N⁴-(2-hydroxyethyl)piperazino]propyl]-2-chloro-5,11-dihydrodibenz[b,e][1,4]thiazepine
Example 35: 5-[N⁴-(3-hydroxypropyl)piperazino]methyl-2-methyl-5,11-dihydrodibenz[b,e][1,4]thiazepine
Example 36: 5-[3-[N⁴-hydroxyethyl)piperazino]propyl]-7-cyclopropyl-5,11-dihydrodibenz[b,e][1,4]thiazepine
Example 37: 5-[3-[N⁴-(2-hydroxyethyl)piperazino]propyl]-3-methoxy-5,11-dihydrodibenz[b,e][1,4]thiazepine
Example 38: 5-[3-[N⁴-(hydroxymethyl)piperazino]propyl]-7-trifluoromethylmercapto-5,11-dihydrodibenz[b,e][1,4]thiazepine
Example 39: 5-[3-[N⁴-(2-hydroxyethyl)piperazino]propyl]-7-methylsulfonyl-5,11-dihydrodibenz-[b,e][1,4]thiazepine
Example 40: 5-[3-[N⁴-hydroxyethyl)piperazino]propyl]-3,7-dichloro-5,11-dihydrodibenzo[b,e][1,4]thiazepine
Example 41: 5-[3-[N⁴-hydroxyethyl)piperazino]propyl]-3,7-dimethyl-5,11-dihydrodibenz[b,e[]1,4]thiazepine
Example 42: 5-[3-[N⁴-undecenoyloxyethyl)piperazino]propyl]-2-trifluoromethyl-5,11-dihydrodibenz[b,e][1,4]thiazepine
Example 43: 5-[3-[N⁴-(2-hydroxyethyl)piperazino]propyl]-7-ethoxy-5,11-dihydrodibenz[b,e[]1,4]thiazepine
Example 44: 5-[3-[N⁴-(2-hydroxyethyl)piperazino]propyl]-3-isocyano-5,11-dihydrodibenz[b,e][1,4]thiazepine
Example 45: 5-[3-[N⁴-(2-hydroxyethyl)piperazino]propyl]-2-trifluoromethyloxy-5,11-dihydrodibenz[b,e][1,4]thiazepine
Example 46: 5-[3-[N⁴-(2-hydroxyethyl)piperazino]propyl]-2-acetyl-5,11-dihydrodibenz[b,e][1,4]thiazepine

What is claimed is:
1. A compound selected from the group consisting of a base of the formula

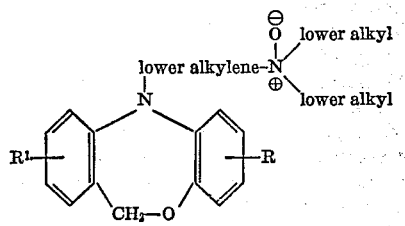

and a non-toxic acid-addition salt thereof, wherein R and $R^1$ are the same or different and are selected from the group consisting of hydrogen, halogen, lower alkyl, lower alkoxy, trifluoromethylmercapto, trifluoromethoxy, N,N'-di-lower alkylsulfonamido, and trifluoromethyl, and wherein the terms lower alkyl and lower alkylene refer to alkyl and alkylene groups having less than eight carbon atoms.

2. A compound in accordance with claim 1 wherein R and $R^1$ are both hydrogen.

3. A non-toxic acid-addition salt of the compound of claim 2.

4. The compound in accordance with claim 1 which is 5-(2 - dimethylaminoethyl)-5,11-dihydrodibenz[b,e][1,4]oxazepine N-oxide maleate.

5. The compound in accordance with claim 1 which is 5 - (3-dimethylamino-2-methylpropyl)-5,11-dihydrodibenz[b,e][1,4]oxazepine N-oxide maleate.

6. The compound in accordance with claim 1 which is 7-(N,N-dimethylaminosulfonyl) - 5,11 - dihydro-5-(2-dimethylaminoethyl)dibenz[b,e][1,4]oxazepine N-oxide.

References Cited

UNITED STATES PATENTS

| | | | |
|---|---|---|---|
| 3,387,002 | 4/1968 | Yale | 260—333 |
| 3,660,406 | 5/1972 | Howell | 260—268 TR |
| 3,697,523 | 10/1972 | Hunziger | 260—268 TR |
| 3,454,598 | 7/1969 | Yale et al. | 260—333 |
| 3,631,052 | 12/1971 | Yale | 260—333 X |
| 2,785,168 | 3/1957 | Tiffan | 260—294 |
| 2,862,968 | 12/1958 | Tiffan | 260—570 |
| 2,931,810 | 4/1960 | Yale et al. | 260—268 TR |
| 3,054,791 | 9/1962 | Yale et al. | 260—268 TR |
| 3,047,579 | 7/1962 | Witman | 260—327 X |
| 3,188,322 | 6/1965 | Yale et al. | 260—327 X |
| 3,069,432 | 12/1962 | Yale et al. | 260—293.4 X |
| 3,210,372 | 10/1965 | Werner | 260—327 |
| 3,341,533 | 9/1967 | Yale et al. | 260—268 TR |
| 3,408,355 | 10/1968 | Renz et al. | 260—293 X |
| 3,509,154 | 4/1970 | Fouche | 260—268 TR |

OTHER REFERENCES

Culvenor: "Amaine Oxides," in Rev. Pure and Applied Chem., vol. 3, pp. 83–91 (1953).

DONALD G. DAUS, Primary Examiner

U.S. Cl. X.R.

260—239 BC, 243 B, 247.1, 247.5 B, 268 TR, 293.58, 326.5 CA, 327 B, 999